United States Patent
Kim et al.

(10) Patent No.: US 9,033,757 B2
(45) Date of Patent: May 19, 2015

(54) METHOD OF FABRICATING LIGHTWEIGHT AND THIN LIQUID CRYSTAL DISPLAY

(71) Applicant: LG Display Co., Ltd., Yeongdeungpo-gu, Seoul (KR)

(72) Inventors: KiYong Kim, Gyeonggi-Do (KR);
JaeKyun Lee, Gyeonggi-Do (KR);
JaeYoung Oh, Gyeonggi-Do (KR);
YongSu An, Gyeonggi-Do (KR);
SungKi Kim, Gyeonggi-Do (KR);
JaeWon Lee, Gyeonggi-Do (KR);
Dongkyu Lee, Jeollabuk-Do (KR)

(73) Assignee: LG Display Co., Ltd., Seoul (KR)

( * ) Notice: Subject to any disclaimer, the term of this patent is extended or adjusted under 35 U.S.C. 154(b) by 318 days.

(21) Appl. No.: 13/685,558

(22) Filed: Nov. 26, 2012

(65) Prior Publication Data

US 2013/0143464 A1 Jun. 6, 2013

(30) Foreign Application Priority Data

Dec. 1, 2011 (KR) .................. 10-2011-0127816

(51) Int. Cl.
| | |
|---|---|
| *H01J 9/00* | (2006.01) |
| *H01J 9/24* | (2006.01) |
| *G02F 1/1335* | (2006.01) |
| *G02F 1/13* | (2006.01) |
| *G02F 1/1333* | (2006.01) |

(52) U.S. Cl.
CPC ........ *G02F 1/133514* (2013.01); *G02F 1/1303* (2013.01); *G02F 1/133351* (2013.01)

(58) Field of Classification Search
USPC ......... 349/106, 123, 187, 190, 158, 138, 130, 349/153; 445/23–25
See application file for complete search history.

(56) References Cited

U.S. PATENT DOCUMENTS

| | | | | |
|---|---|---|---|---|
| 5,528,403 | A * | 6/1996 | Kawaguchi et al. | 349/149 |
| 7,553,390 | B2 * | 6/2009 | Yamabuchi et al. | 156/257 |

(Continued)

FOREIGN PATENT DOCUMENTS

| | | |
|---|---|---|
| CN | 102007524 A | 0/4201 |
| CN | 101187744 A | 5/2008 |

(Continued)

OTHER PUBLICATIONS

State Intellectual Property Office of the People's Republic of China, First Office Action, Chinese Patent Application No. 201210506163.8, Dec. 12, 2014, seventeen pages.

*Primary Examiner* — Thomas A Hollweg
*Assistant Examiner* — Kevin Quarterman
(74) *Attorney, Agent, or Firm* — Fenwick & West LLP

(57) ABSTRACT

In a method for fabricating a lightweight and thin liquid crystal display (LCD), a first mother substrate, a subsidiary substrate and a thin second mother substrate are provided. An edge cut is formed by cutting edges of the first and second mother substrates and the subsidiary substrate to be inclined at a predetermined angle. An array process is performed on the first mother substrate. The subsidiary substrate is attached to the second mother substrate. A color filter process is performed on the second mother substrate having the subsidiary substrate attached thereto. The first and second mother substrates are attached together. The subsidiary substrate is separated from the first and second substrates by spraying air between the second mother substrate and the subsidiary substrate, in which the edge cut is formed.

22 Claims, 15 Drawing Sheets

(56) References Cited

U.S. PATENT DOCUMENTS

| | | | |
|---|---|---|---|
| 7,618,256 B2* | 11/2009 | Park et al. | 432/258 |
| 8,665,519 B2* | 3/2014 | Bell et al. | 359/491.01 |
| 2002/0063834 A1* | 5/2002 | Sawasaki et al. | 349/130 |
| 2003/0038914 A1* | 2/2003 | Kim et al. | 349/153 |
| 2003/0151710 A1* | 8/2003 | Tanaka et al. | 349/123 |
| 2007/0153221 A1* | 7/2007 | Yoo et al. | 349/187 |
| 2007/0164956 A1* | 7/2007 | Araki et al. | 345/90 |
| 2008/0002137 A1* | 1/2008 | Kim et al. | 349/187 |

FOREIGN PATENT DOCUMENTS

| | | |
|---|---|---|
| CN | 101930169 A | 12/2010 |
| JP | S58-54316 A | 3/1983 |
| JP | 3202718 B2 | 6/2001 |

* cited by examiner

METHOD OF FABRICATING LIGHTWEIGHT AND THIN LIQUID CRYSTAL DISPLAY

CROSS-REFERENCE TO RELATED APPLICATION

Pursuant to 35 U.S.C. §119(a), this application claims the benefit of earlier filing date and right of priority to Korean Application No. 10-2011-0127816, filed on Dec. 1, 2011, the contents of which is incorporated by reference herein in its entirety.

BACKGROUND OF THE INVENTION

1. Field of the Invention

The present disclosure relates to a method of fabricating a liquid crystal display, and particularly, to a method of fabricating a lightweight and thin liquid crystal display.

2. Description of the Related Art

Recently, with the advent of the information age, a display field for processing and displaying mass information has been rapidly developed. Particularly, thin film transistors (TFTs) and liquid crystal displays (LCDs) having light, thin and low-power characteristics have recently been developed to substitute for existing cathode ray tubes (CRTs).

The LCD generally includes a color filter substrate, an array substrate and a liquid crystal layer formed between the color filter substrate and the array substrate.

The color filter substrate includes a color filter having red (R), green (G) and blue (B) sub-color filters, a black matrix for dividing between the sub-color filters and blocking light passing through the liquid crystal layer, and a transparent common electrode for applying voltage to the liquid crystal layer.

Gate and data lines vertically and horizontally arranged to define pixel regions are formed on the array substrate. In this case, TFTs that are switching elements are formed at intersection regions of the gate and data lines, and a pixel electrode is formed in each pixel region.

The color filter and array substrates configured as described above are attached together to face each other by a sealant formed at the edges of an image display area to form a liquid crystal panel. The attachment between the color filter substrate and the array substrate is made by attachment keys formed on the color filter substrate or the array substrate.

Particularly, the LCD is frequently used in portable electronic devices, and hence the size and weight of the LCD should be decreased so that the portability of the electronic devices can be improved. Moreover, as large-area LCDs have recently fabricated, demands on lightweight and thin LCDs are more sever.

Various methods may be used to decrease the thickness or weight of an LCD, but there is a limitation in decreasing the thickness or weight of an essential component of the LCD due to its structure and current technology. Moreover, since the weight of the essential component is small, it is considerably difficult to decrease the entire thickness or weight of the LCD by decreasing the weight of the essential component.

Accordingly, studies have been actively conducted to develop a method of decreasing the thickness and weight of an LCD by decreasing the thicknesses of a color filter substrate and an array substrate, which constitute a liquid crystal panel. However, since a thin substrate should be used, there occurs a phenomenon that the substrate is bent or broken in movement between a plurality of unit processes or in performance of the unit processes.

SUMMARY OF THE INVENTION

Therefore, an aspect of the detailed description is to provide a method of fabricating a lightweight and thin liquid crystal display (LCD), in which a process is performed by attaching a subsidiary substrate to a thin glass substrate, thereby prevent damage of the thin glass substrate.

Another aspect of the detailed description is to provide a method of fabricating a lightweight and thin LCD, which can easily separate a subsidiary substrate from a liquid crystal panel in a cell state, which is attached by completing processes.

To achieve these and other advantages and in accordance with the purpose of this specification, as embodied and broadly described herein, a method of fabricating a lightweight and thin LCD includes providing a first mother substrate, a subsidiary substrate and a thin second mother substrate; forming an edge cut by cutting edges of the first and second mother substrates and the subsidiary substrate to be inclined at a predetermined angle; performing an array process on the first mother substrate; attaching the subsidiary substrate to the second mother substrate; performing a color filter process on the second mother substrate having the subsidiary substrate attached thereto; attaching together the first and second mother substrates; and separating the subsidiary substrate from the first and second substrates by spraying air between the second mother substrate and the subsidiary substrate, in which the edge cut is formed.

In one exemplary embodiment, the first mother substrate may be cut further inward than the lower subsidiary substrate so that an edge portion of the lower subsidiary substrate is exposed.

In one exemplary embodiment, the method may further include fixing the first mother substrate by absorbing a top of the first mother substrate using a plurality of vacuum pads, after the first and second mother substrates are attached together.

In one exemplary embodiment, the method may further include forming a space between the subsidiary substrate and the second mother substrate by pressing the exposed edge portion of the subsidiary substrate in a lower direction with a predetermined pressure using a push-bar or pin-shaped tool in the state in which the first mother substrate is fixed by absorbing the top of the first mother substrate using the plurality of vacuum pads.

In one exemplary embodiment, the subsidiary substrate may be separated from the first and second mother substrates by spraying air into the space formed between the subsidiary substrate and the second mother substrate through an air spray apparatus or by using a surfactant such as soapy water or an ionizer.

In one exemplary embodiment, the first and second mother substrates may be separated from the subsidiary substrate by gradually lifting the vacuum pads in the state in which the subsidiary substrate is separated from the first and second mother substrates by spraying air into the space formed between the subsidiary substrate and the second mother substrate through the air spray apparatus or by using the surfactant such as soapy water or the ionizer.

In one exemplary embodiment, the first and second mother substrates may be separated from the subsidiary substrate by gradually lifting the vacuum pads as close to an edge portion of the first mother substrate, in which the edge cut is formed.

In one exemplary embodiment, the attaching of the subsidiary substrate to the second mother substrate may include performing a chemical treatment including a plasma treatment or forming patterns such as prominences on a surface of the subsidiary substrate; and attaching, to the second mother substrate, the subsidiary substrate on which the chemical treatment is performed or the patterns are formed.

In one exemplary embodiment, the second mother substrate may have a thickness of about 0.1 mm to 0.5 mm.

In one exemplary embodiment, the subsidiary substrate may have a thickness of about 0.3 mm to 0.7 mm.

To achieve these and other advantages and in accordance with the purpose of this specification, as embodied and broadly described herein, a method of fabricating a lightweight and thin LCD includes providing first and second subsidiary substrates and thin first and second mother substrates; forming an edge cut by cutting edges of the first and second subsidiary substrates to be inclined at a predetermined angle; respectively attaching the first and second subsidiary substrates to the first and second mother substrates; performing an array process on the first mother substrate having the first subsidiary substrate attached thereto; performing a color filter process on the second mother substrate having the second subsidiary substrate attached thereto; attaching together the first and second mother substrates; separating the first subsidiary substrate from the first and second mother substrates by spraying air between the first mother substrate and the first subsidiary substrate, in which the edge cut is formed; and separating the second subsidiary substrate from the first and second mother substrates by spraying air between the second mother substrate and the second subsidiary substrate, in which the edge cut is formed.

In one exemplary embodiment, the second subsidiary substrate may be cut further inward than the lower first subsidiary substrate so that an edge portion of the lower first substrate is exposed.

In one exemplary embodiment, the method may further include fixing the second subsidiary substrate by absorbing the top of the second subsidiary substrate using a plurality of vacuum pads, after the first and second mother substrates are attached together.

In one exemplary embodiment, the method may further include forming a space between the first subsidiary substrate and the first mother substrate by pressing the exposed edge portion of the first subsidiary substrate in a lower direction with a predetermined pressure using a push-bar or pin-shaped too in the state in which the second subsidiary substrate is fixed by absorbing the top of the second subsidiary substrate using the plurality of vacuum pads.

In one exemplary embodiment, the first subsidiary substrate may be separated from the first and second mother substrates by spraying air into the space formed between the first subsidiary substrate and the first mother substrate through an air spray apparatus or by using a surfactant such as soapy water or an ionizer.

In one exemplary embodiment, the first and second mother substrates may be separated from the first subsidiary substrate by gradually lifting the vacuum pads in the state in which the first subsidiary substrate is separated from the first and second mother substrates by spraying air into the space formed between the first subsidiary substrate and the first mother substrate through the air spray apparatus or by using the surfactant such as soapy water or the ionizer.

In one exemplary embodiment, the first and second mother substrates may be separated from the first subsidiary substrate by gradually lifting the vacuum pads as close to the edge portion of the first subsidiary substrate, in which the edge cut is formed.

In one exemplary embodiment, the method may further include vertically reversing the first and second mother substrates in the state in which the first subsidiary substrate is separated from the first and second mother substrates.

In one exemplary embodiment, the second subsidiary substrate may be separated from the attached first and second mother substrates.

In one exemplary embodiment, the attaching of the first and second subsidiary substrates to the respective first and second mother substrates may include performing a chemical treatment including a plasma treatment or forming patterns such as prominences on surfaces of the first and second subsidiary substrates; and respectively attaching, to the first and second mother substrates, the first and second subsidiary substrates on which the chemical treatment is performed or the patterns are formed.

In one exemplary embodiment, the first and second mother substrates may have a thickness of about 0.1 mm to 0.5 mm.

In one exemplary embodiment, the first and second subsidiary substrates may have a thickness of about 0.3 mm to 0.7 mm.

As described above, in the method of fabricating a lightweight and thin LCD according to the present invention, the lightweight and thin LCD can be implemented using a thin glass substrate, so that it is possible to decrease the thickness or weight of a television, monitor or portable device.

Further, in the method of fabricating a lightweight and thin LCD according to the present invention, an air blowing path is formed between a thin glass substrate and a subsidiary substrate using an edge cut formed in the glass substrate, so that the subsidiary substrate can be easily separated from a liquid crystal panel in a cell state, which is attached by completing processes. As a result, it is possible to obtain stabilization of processes, thereby improving the price competitiveness of products.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

As the use of liquid crystal displays (LCDs) is diversified, interest in a lightweight and thin LCD has recently been increased, and interest in a thin substrate that occupies a large portion in the thickness of a liquid crystal panel has also been increased. In a 3D or touch panel, a retarder or protection substrate with a touch function is added to a liquid crystal panel, and therefore, requirements of a thin substrate are more increased. However, the thin substrate has a limitation in performance of processes due to deterioration of physical properties such as warp and rigidity.

To solve such a problem, a method is attempted in which a process is performed by attaching a subsidiary substrate to a thin glass substrate, and the subsidiary substrate is then separated from the thin glass substrate after the process is completed. Particularly, in the present invention, a process is performed by attaching a subsidiary substrate to a thin glass substrate using an electrostatic force, vacuum force, surface tension, etc. Then, the attachment force between the thin glass substrate and the subsidiary substrate is reduced by performing a plasma treatment on a subsidiary substrate using fluorine, etc., or forming prominent patterns on the subsidiary substrate, and an air blowing path is formed between the thin glass substrate and the subsidiary substrate using an edge cut formed in the thin glass substrate. Accordingly, the subsidiary substrate is easily separated from a liquid crystal panel in a cell state, which is attached by completing the processes.

Hereinafter, an exemplary embodiment of a method of fabricating a lightweight and thin LCD according to the present invention will be described in detail with reference to the accompanying drawings.

Figure 1:
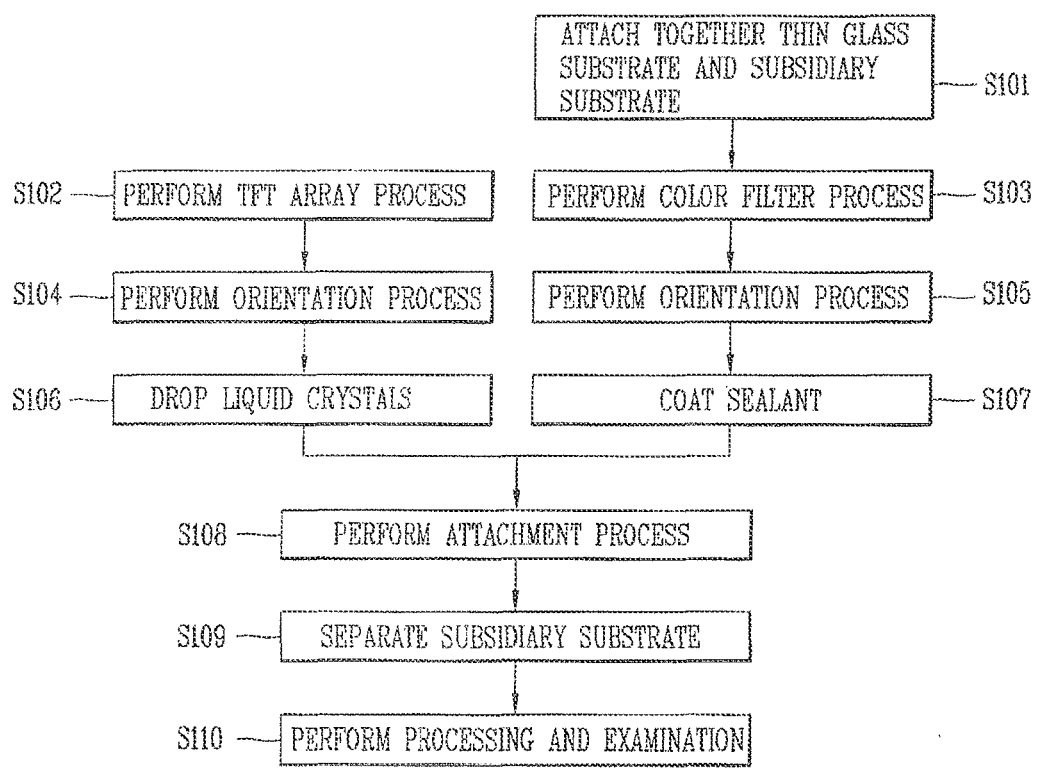
FIG. 1 is a flowchart schematically illustrating a method of fabricating a lightweight and thin liquid crystal display (LCD) according to an exemplary embodiment of the present invention.

FIG. 1 is a flowchart schematically illustrating a method of fabricating a lightweight and thin LCD according to an exemplary embodiment of the present invention.

Although the method in which a liquid crystal layer is formed using a liquid crystal dropping method is illustrated as an example in FIG. 1, the present invention is not limited thereto and may be applied to the method in which a liquid crystal layer is formed using a liquid crystal injection method.

The process of fabricating the LCD can be divided into a driving element array process of forming a driving element on a lower array substrate, a color filter process of forming a color filter on an upper color filter substrate, and a cell process.

As described above, there are various components that have influence on the thickness or weight of the LCD, but the color filter substrate or array substrate made of glass is the heaviest component among these components. Thus, in order to decrease the thickness or weight of the LCD, it is most efficient to decrease the thickness or weight of the glass substrate.

The method of decreasing the thickness or weight of the glass substrate includes a method of decreasing the thickness of the glass substrate by etching the glass substrate or a method of using a thin glass substrate. In the first method, the thickness of the glass substrate is decreased by additionally performing a glass etching process after a cell is completed. The first method has disadvantages in that a failure occurs in the etching process, and fabrication cost increases.

Accordingly, in the present invention, the array process, the color filter process and the cell process are performed using a thin glass substrate having a thickness of about 0.1 t to 0.5 t. In this case, the processes are performed by attaching the thin glass substrate to a subsidiary substrate, so that it is possible to minimize warp of the thin glass substrate and to prevent damage of the thin glass substrate during its movement. Here, the 't' means millimeter (mm), and 0.1 t and 0.5 t means a thickness of 0.1 mm and a thickness of 0.5 mm, respectively. Hereinafter, 'mm' is designated by 't' for convenience of illustration.

That is, when being introduced to a general LCD fabrication line, the thin glass substrate having the thickness of about 0.1 t to 0.5 t is considerably warped, and therefore, the drooping of the thin glass substrate seriously occurs. Hence, there is problem in moving the thin glass substrate using a moving means. When being loaded/unloaded into/from unit process equipment, the thin glass substrate is rapidly warped by a small impact, and therefore, a position error frequently occurs. As a result, damage of the thin glass substrate is increased by collision, etc., and therefore, it is substantially impossible to perform the processes.

Accordingly, in the present invention, a subsidiary substrate is attached to the thin glass substrate having the thickness of 0.1 t to 0.5 t before being introduced to the LCD fabrication line, so that the thin glass substrate has an anti-warp characteristic identical to or further improved than that of a glass substrate having a thickness of about 0.7 t, used in a general LCD, thereby preventing the occurrence of substrate drooping, etc. during movement or performance of a unit process.

First, before a thin glass substrate having a thickness of 0.1 t to 0.5 t is introduced to the fabrication line of the array process and the color filter process, a subsidiary substrate having a thickness of about 0.3 t to 0.7 t is attached to the thin glass substrate having the thickness of 0.1 t to 0.5 t (S101). However, the present invention is not limited to the thicknesses of the thin glass substrate and the subsidiary substrate.

The thin glass substrate and the subsidiary substrate can be attached by contacting the two substrates with each other in a vacuum state. In this case, the attachment force between the two substrates may be presumed as an electrostatic force, vacuum force, surface tension, etc.

Although it has been described in this exemplary embodiment that the subsidiary substrate is attached to only the color filter substrate using a thin glass substrate, and a general glass substrate having a thickness of about 0.7 t is used as the array substrate, the present invention is not limited thereto. That is, the subsidiary substrate may be attached to only the array substrate using a thin glass substrate as the array substrate. In addition, as will be described later, subsidiary substrates may be attached to both the color filter substrate and the array substrate using thin glass substrates as the subsidiary substrates, respectively.

Particularly, in the present invention, the attachment force between the thin glass substrate and the subsidiary substrate is reduced by performing a plasma treatment on the subsidiary substrate using fluorine, etc., or forming prominent patterns on the subsidiary substrate, thereby facilitating the detachment of the subsidiary substrate from the thin glass substrate. This will be described in detail with reference to the following drawings.

FIGS. 2A to 2D are exemplary views schematically illustrating some processes in the method according to an exemplary embodiment of the present invention. A process of attaching and detaching a plasma-treated subsidiary substrate to/from a thin glass substrate is illustrated as an example.

In the exemplary embodiment of the present invention, the attachment between a subsidiary substrate and a thin glass substrate is reduced by performing a plasma treatment on the entire surface of the subsidiary substrate, so that it is possible to facilitate the detachment of the subsidiary substrate from the thin glass substrate.

Figure 2A:
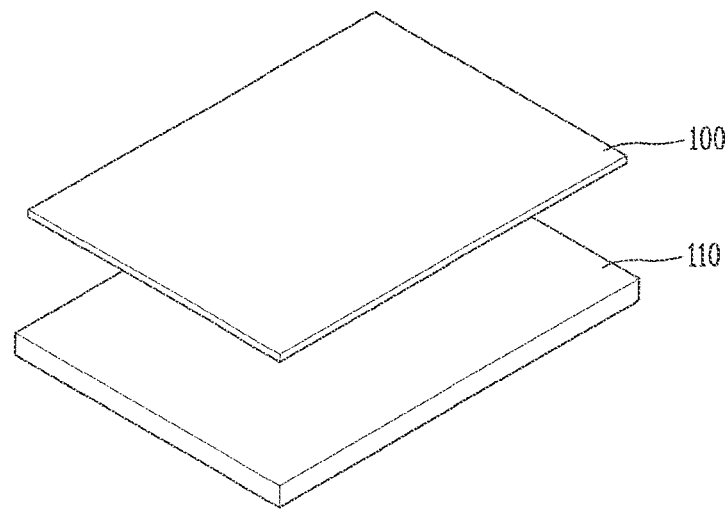
FIGS. 2A to 2D are exemplary views schematically illustrating some processes in the method according to the exemplary embodiment of the present invention.

As shown in FIG. 2A, there are prepared, for example, a thin glass substrate 100 having a thickness of about 0.1 t to 0.5 t and a subsidiary substrate 110 having a thickness of about 0.3 t to 0.7 t.

Here, the thin glass substrate 100 may be a large-area mother substrate in which a plurality of color filter substrates for a color filter process are arranged or a large-area mother substrate in which a plurality of array substrates for an array process are arranged.

Figure 2B:
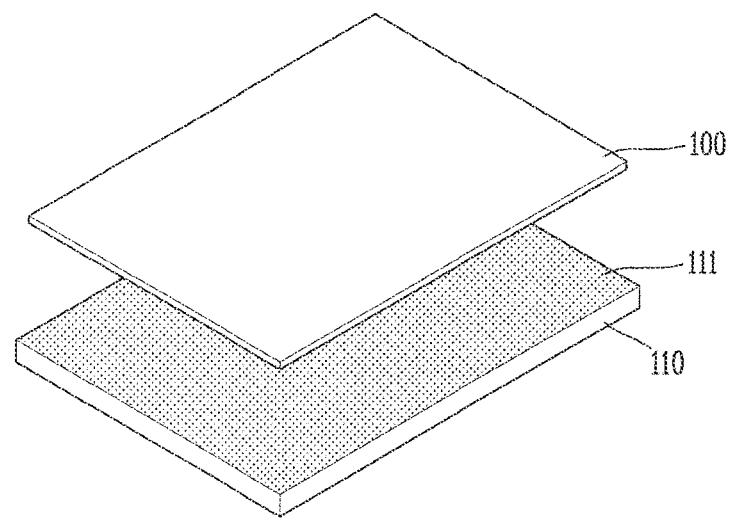

Next, as shown in FIG. 2B, a plasma treatment is performed on the entire surface 111 of the subsidiary substrate 110 using fluorine, etc. so that the subsidiary substrate 110 is easily detached from the thin glass substrate 100.

In a case where the plasma treatment is performed on the subsidiary substrate 110 using the fluorine, the fluorine may etch the surface 111 of the subsidiary substrate 110 so that the roughness of the surface 111 of the subsidiary substrate 110 is increased, or may change a chemical property of the surface 111 of the subsidiary substrate 110 so that the attachment force caused by the contact between the subsidiary substrate 110 and the thin glass substrate 100 is weakened.

Figure 2C:
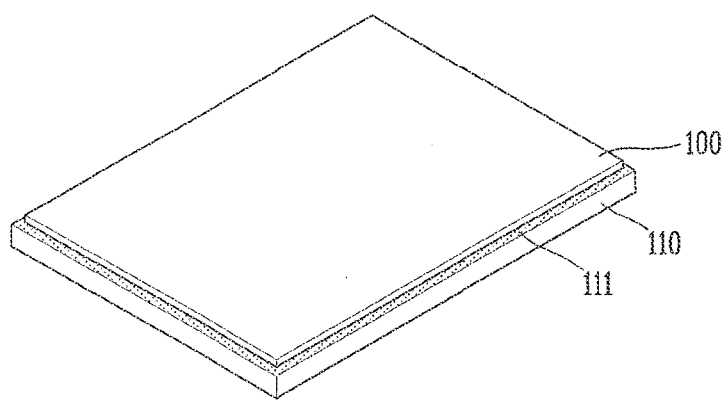

Next, as shown in FIG. 2C, the subsidiary substrate 110 having the plasma treatment performed thereon is attached to the thin glass substrate 100. In a case where a glass substrate is used as the subsidiary substrate 110, the attachment between the thin glass substrate 100 and the subsidiary substrate 110 may be performed by contacting the two substrates 100 and 110 with each other in a vacuum state. In this case, the attachment force between the two substrates 100 and 110 may be presumed as an electrostatic force, vacuum force, surface tension, etc.

In a panel for processes in the state in which the thin glass substrate 100 having the thickness of 0.1 t to 0.5 t and the subsidiary substrate 110 having the thickness of 0.3 t to 0.7 t are attached together as described above, the thin glass substrate 100 and the subsidiary substrate 110, which constitute the panel for processes are made of the same glass material, and therefore, expansion coefficients of the two substrates according to a change in temperature are identical to each other. Thus, there is no problem in that a warp occurs due to a difference in expansion coefficient between the two substrates when a unit process is performed, etc.

The thin glass substrate 100 itself has the thickness of 0.1 t to 0.5 t. However, as the panel for processes is configured by attaching together the thin glass substrate 100 and the subsidiary substrate 110, the occurrence of a warp is remarkably reduced. The degree of the warp is identical to or less than that of a general glass having a thickness of 0.7 t, and thus there is no problem when the unit process for the LCD is performed.

Subsequently, a color filter process or an array process, which will be described later, is performed on the thin glass substrate 100 having the subsidiary substrate 110 attached thereto so that a thin film transistor (TFT) as a driving element or a color filter layer is formed in each panel region.

Figure 2D:
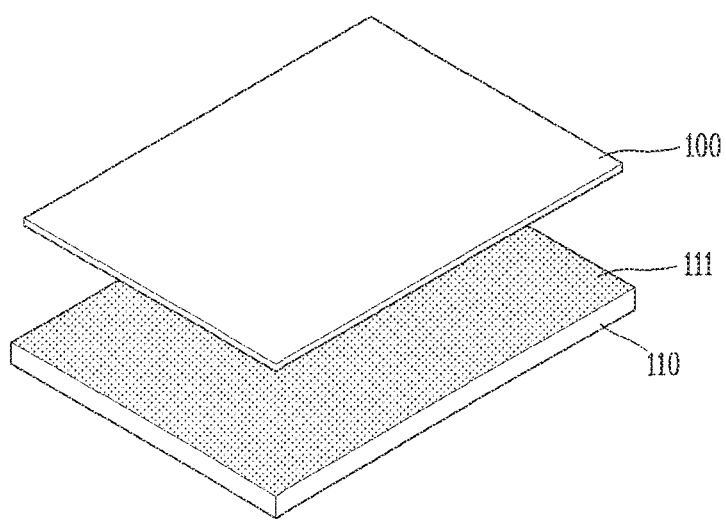

After a predetermined process is finished, the subsidiary substrate 110 is separated from the thin glass substrate 100 as shown in FIG. 2D. In the exemplary embodiment of the present invention, the plasma treatment is performed on the entire surface 111 of the subsidiary substrate 110, and thus the subsidiary substrate 110 can be easily detached from the thin glass substrate 100.

That is, in a case where the attachment force between the thin glass substrate 100 and the subsidiary substrate 110 is strong, it is difficult to physically separate the subsidiary substrate 110 from the thin glass substrate 100, and therefore, a warp may occur in the thin glass substrate 100 in the separation. However, in a case where the plasma treatment is performed on the entire surface of the subsidiary substrate 110, the attachment force between the thin glass substrate 100 and the subsidiary substrate 110 is lowered, and thus the subsidiary substrate 110 can be easily detached from the thin glass substrate 100.

The subsidiary substrate 110 detached from the thin glass substrate 100 as described above may be attached to a new glass substrate so as to be recycled for the purpose of a new process.

Meanwhile, the plasma treatment may be performed not only on the entire surface of the subsidiary substrate 110 but also on a partial surface of the subsidiary substrate 110. This will be described in detail with reference to the following drawings.

FIGS. 3A to 3D are another exemplary views schematically illustrating some processes in the method according to an exemplary embodiment of the present invention. A process of attaching and detaching a plasma-treated subsidiary substrate to/from a thin glass substrate is illustrated as an example.

In the exemplary embodiment of the present invention, the attachment between the subsidiary substrate and the thin glass substrate is reduced by performing a plasma treatment on a partial surface of the subsidiary substrate, so that the subsidiary substrate can be easily detached from the thin glass substrate.

Figure 3A:
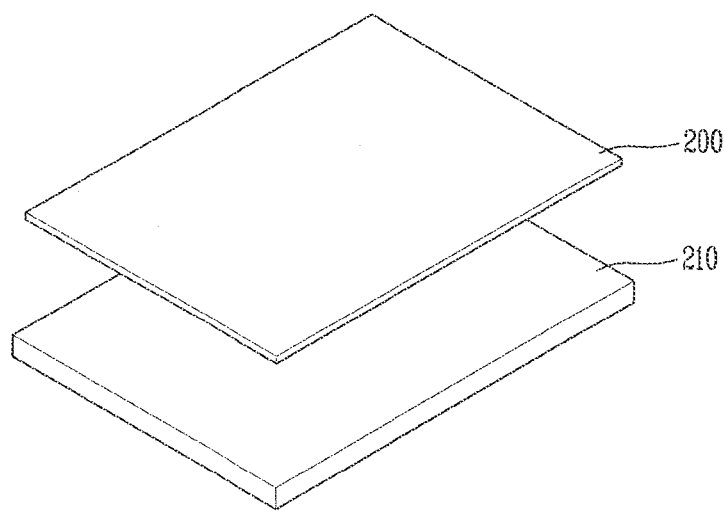
FIGS. 3A to 3D are another exemplary views schematically illustrating some processes in the method according to the exemplary embodiment of the present invention.

As shown in FIG. 3A, there are prepared, for example, a thin glass substrate 200 having a thickness of about 0.1 t to 0.5 t and a subsidiary substrate 210 having a thickness of about 0.3 t to 0.7 t.

Here, the thin glass substrate 200 may be a large-area mother substrate in which a plurality of color filter substrates for a color filter process are arranged or a large-area mother substrate in which a plurality of array substrates for an array process are arranged.

Figure 3B:
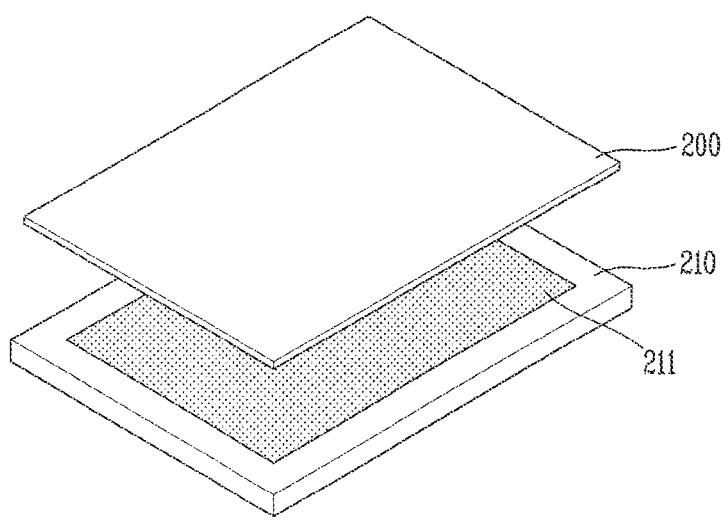

Next, as shown in FIG. 3B, a plasma treatment is performed on a partial surface 211 of the subsidiary substrate 210 using fluorine, etc. so that the subsidiary substrate 210 can be easily detached from the thin glass substrate 200. Although it has been illustrated in FIG. 3B that the plasma treatment is performed on the partial surface 211 at the center of the subsidiary substrate 210 using the fluorine, the present invention is not limited thereto.

In a case where the plasma treatment is performed on the subsidiary substrate 210 using the fluorine, the fluorine may etch the partial surface 211 of the subsidiary substrate 210 so that the roughness of the partial surface 211 of the subsidiary substrate 210 is increased, or may change a chemical property of the partial surface 211 of the subsidiary substrate 210 so that the attachment force caused by the contact between the subsidiary substrate 210 and the thin glass substrate 200 is weakened. Particularly, in the exemplary embodiment of the present invention, as the plasma treatment is performed on only the partial surface 211 of the subsidiary substrate 210 using the fluorine, the attachment between the two substrates 200 and 210 is performed in a region in which the contact between the two substrates 200 and 210 is possible. When the subsidiary substrate 210 is detached from the thin glass substrate 200, the detachment can be easily performed due to the region in which the plasma treatment is performed using the fluorine, i.e., the partial surface 211.

Figure 3C:
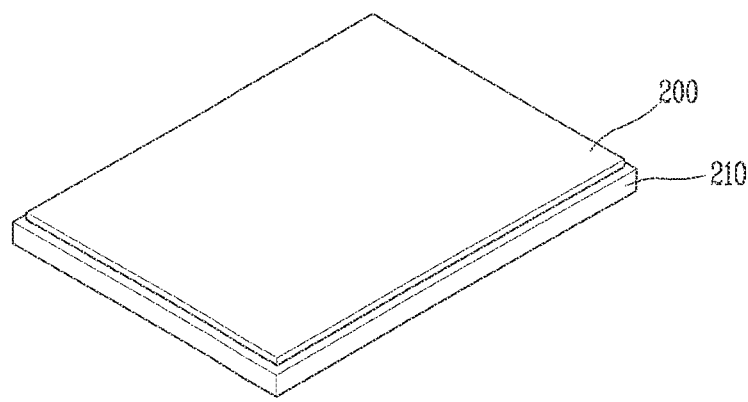

Next, as shown in FIG. 3C, the subsidiary substrate 210 having the plasma treatment performed thereon is attached to the thin glass substrate 200. In a case where a glass substrate is used as the subsidiary substrate 210, the attachment between the thin glass substrate 200 and the subsidiary substrate 210 may be performed by contacting the two substrates 200 and 210 with each other in a vacuum state. In this case, the attachment force between the two substrates 200 and 210 may be presumed as an electrostatic force, vacuum force, surface tension, etc.

Subsequently, a color filter process or an array process, as described above, is performed on the thin glass substrate 200 having the subsidiary substrate 210 attached thereto so that a TFT as a driving element or a color filter layer is formed in each panel region.

Figure 3D:
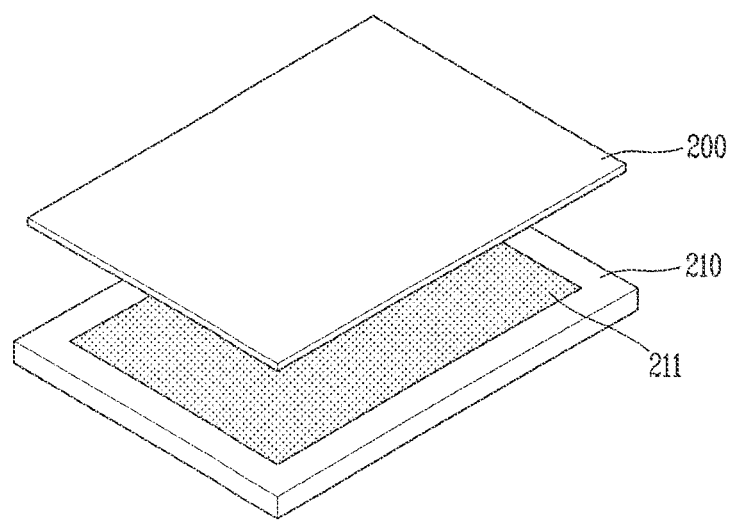

After a predetermined process is finished, the subsidiary substrate 210 is separated from the thin glass substrate 200 as shown in FIG. 3D. In the exemplary embodiment of the present invention, the plasma treatment is performed on the partial surface 211 of the subsidiary substrate 210, and thus the subsidiary substrate 210 can be easily detached from the thin glass substrate 200.

Meanwhile, although it has been described in this exemplary embodiment that the attachment force between the thin glass substrate 200 and the subsidiary substrate 210 is reduced by performing the plasma treatment on the subsidiary substrate 210, so that the subsidiary substrate 210 can be easily detached from the thin glass substrate 200, the present invention is not limited thereto. That is, the attachment force between the thin glass substrate 200 and the subsidiary substrate 210 may be reduced by forming prominent patterns on the subsidiary substrate 210. This will be described in detail with reference to the following drawings.

FIGS. 4A to 4D are still another exemplary views schematically illustrating some processes in the method according to an exemplary embodiment of the present invention. A process of attaching and detaching a subsidiary substrate having prominent patterns formed thereon to/from a thin glass substrate is illustrated as an example.

In the exemplary embodiment of the present invention, the attachment force between the subsidiary substrate and the thin glass substrate is reduced by forming prominent patterns on a portion of the subsidiary substrate so that the subsidiary substrate can be easily detached from the thin glass substrate.

Figure 4A:
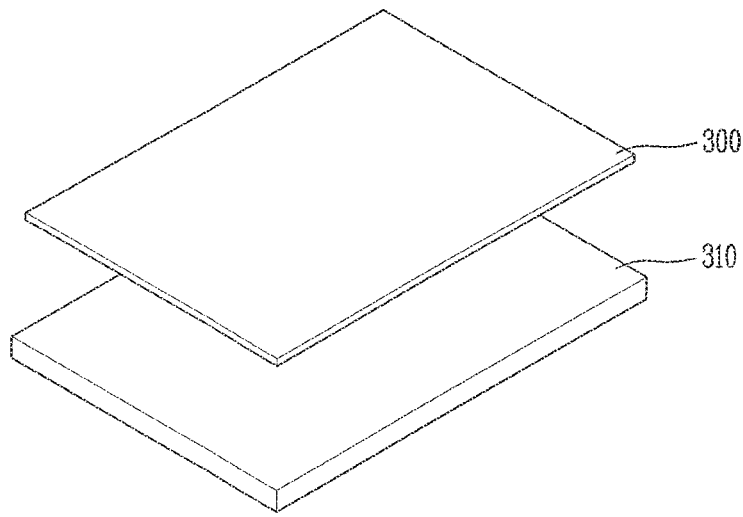
FIGS. 4A to 4D are still another exemplary views schematically illustrating some processes in the method according to the exemplary embodiment of the present invention.

As shown in FIG. 4A, there are prepared, for example, a thin glass substrate 300 having a thickness of about 0.1 t to 0.5 t and a subsidiary substrate 310 having a thickness of about 0.7 t.

Here, the thin glass substrate 300 may be a large-area mother substrate in which a plurality of color filter substrates for a color filter process are arranged or a large-area mother substrate in which a plurality of array substrates for an array process are arranged.

Figure 4B:
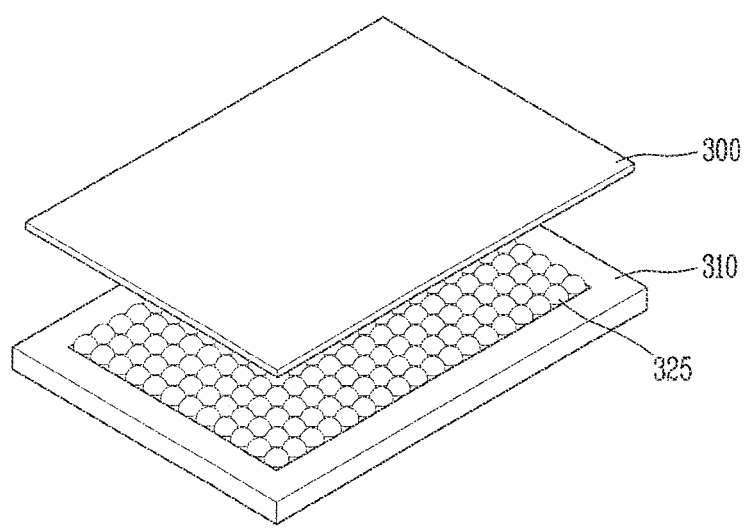

Next, as shown in FIG. 4B, prominent patterns 325 are formed on a partial surface of the subsidiary substrate 310 so that the subsidiary pattern 310 can be easily detached from the thin glass substrate 300. Although it has been illustrated in FIG. 4B that the prominent patterns 325 are formed on the partial surface at the center of the subsidiary substrate 310, the present invention is not limited thereto.

The method of forming the prominent patterns 325 may include a patterning method of an inorganic insulating layer, a patterning method of an organic insulating layer, a low-temperature $SiO_2$ etching method, a laser patterning method, etc.

In a case where the prominent patterns 325 are formed on the subsidiary substrate 310, the attachment force caused by the contact between the subsidiary substrate 310 and the thin glass substrate 300 may be weakened as the roughness of the partial surface of the subsidiary substrate 310 is increased. Particularly, in the exemplary embodiment of the present invention, as the prominent patterns 325 are formed on only the partial surface of the subsidiary substrate 310, the attachment between the two substrates 300 and 310 is performed in a region in which the contact between the two substrates 300 and 310 is possible. When the subsidiary substrate 310 is detached from the thin glass substrate 300, the detachment can be easily performed due to the region in which the prominent patterns 325 are formed.

Figure 4C:
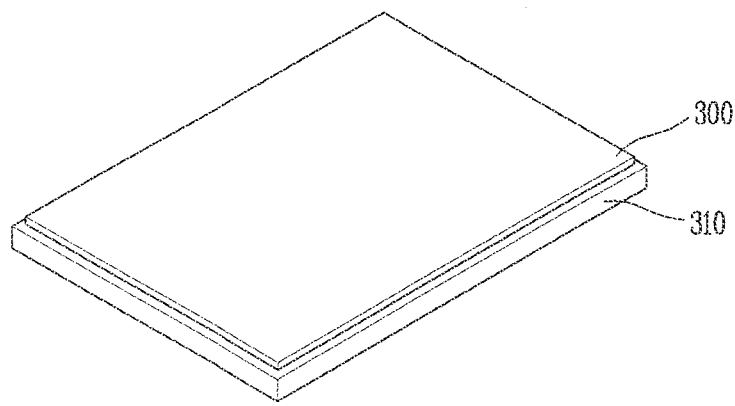

Next, as shown in FIG. 4C, the subsidiary substrate 310 having the prominent patterns 325 formed thereon is attached to the thin glass substrate 300. In a case where a glass substrate is used as the subsidiary substrate 310, the attachment between the thin glass substrate 300 and the subsidiary substrate 310 may be performed by contacting the two substrates 300 and 310 with each other in a vacuum state. In this case, the attachment force between the two substrates 300 and 310 may be presumed as an electrostatic force, vacuum force, surface tension, etc.

In a panel for processes in the state in which the thin glass substrate 300 having the thickness of 0.1 t to 0.5 t and the subsidiary substrate 310 having the thickness of 0.7 t are attached together as described above, the thin glass substrate 300 and the subsidiary substrate 310, which constitute the panel for processes are made of the same glass material, and therefore, expansion coefficients of the two substrates according to a change in temperature are identical to each other. Thus, there is no problem in that a warp occurs due to a difference in expansion coefficient between the two substrates when a unit process is performed, etc.

The thin glass substrate 300 itself has the thickness of 0.1 t to 0.5 t. However, as the panel for processes is configured by attaching together the thin glass substrate 300 and the subsidiary substrate 310, the occurrence of a warp is remarkably reduced. The degree of the warp is identical to or less than that of a general glass having a thickness of 0.7 t, and thus there is no problem when the unit process for the LCD is performed.

Subsequently, a color filter process or an array process, as described above, is performed on the thin glass substrate 300 having the subsidiary substrate 310 attached thereto so that a TFT as a driving element or a color filter layer is formed in each panel region.

Figure 4D:
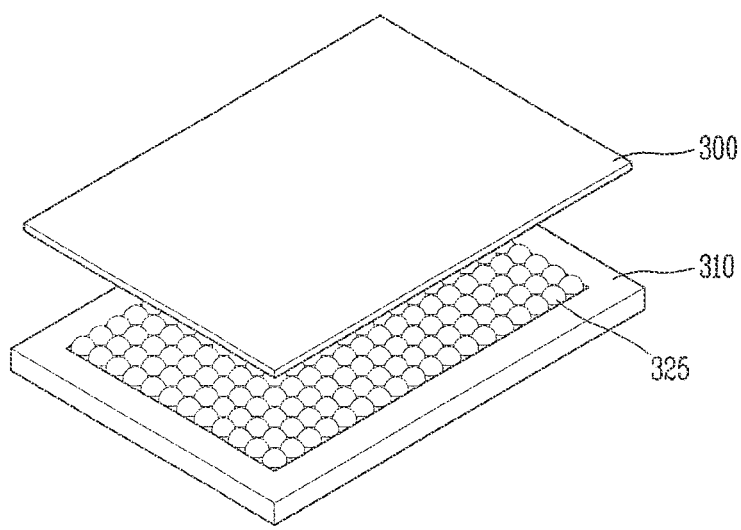

After a predetermined process is finished, the subsidiary substrate 310 is separated from the thin glass substrate 300 as shown in FIG. 4D. In the exemplary embodiment of the present invention, the prominent patterns 325 are formed on the partial surface of the subsidiary substrate 310, and thus the subsidiary substrate 310 can be easily detached from the thin glass substrate 300.

The subsidiary substrate 310 detached from the thin glass substrate 300 as described above may be attached to a new glass substrate so as to be recycled for the purpose of a new process.

Meanwhile, as will be described later, a method of lifting a subsidiary substrate or a thin glass substrate by holding a top of the subsidiary substrate or the thin glass substrate using a vacuum pad may be used as the detaching method applicable to the embodiments. In the method, the attachment force between the two substrates is not large due to the plasma treatment of a surface of the subsidiary substrate or the formation of prominent patterns so that the subsidiary substrate can be easily detached from the thin glass substrate. Here, air blowing may be used so that the subsidiary substrate is more easily detached from the thin glass substrate. In this case, an air blowing path is formed between the thin glass substrate and the subsidiary substrate using an edge cut formed in the thin glass substrate, so that the subsidiary substrate can be easily separated from the thin glass substrate through air blowing.

Subsequently, a plurality of gate and data lines arranged on the array substrate through an array process so as to define pixel regions are formed on the array substrate, and TFTs as driving elements connected to the gate and data lines are formed in the pixel regions, respectively (S102). As a pixel electrode connected to the TFTs through the array process so as to drive a liquid crystal layer as a signal is applied to the pixel electrode through the TFTs is formed on the array substrate.

A color filter layer composed of red, green and blue sub-color filters that express colors through a color filter process and a common electrode are formed on a thin glass substrate for a color filter substrate (hereinafter, referred to as a color filter substrate for convenience of illustration), to which the subsidiary substrate described above is attached (S103). In a case where an in-plane switching (IPS) type LCD is fabricated, the common electrode is formed on the array substrate on which the pixel electrode is formed through the array process.

Subsequently, orientation layers are printed on the color filter substrate and the array substrate, respectively, and a rubbing treatment is performed on the orientation layers so as to provide an anchoring force or surface fixing force (i.e., pretilt angle and orientation direction) to liquid crystal molecules of the liquid crystal layer formed between the color filter substrate and the array substrate (S104 and S105).

A predetermined seal pattern is formed by coating a sealant on the color filter substrate on which the rubbing treatment is performed, and simultaneously, the liquid crystal layer is formed by dropping liquid crystals on the array substrate (S106 and S107).

Meanwhile, the color filter substrate and the array substrate are formed on large-area mother substrates, respectively. In other words, a plurality of panel regions are formed on each large-area mother substrate, and a TFT as a driving element or a color filter layer is formed in each panel region.

In this case, the dropping method is a method of dropping or dispensing liquid crystals, using a dispenser, in an image display region of a large-area first mother substrate on which a plurality of array substrates are arranged or a second mother substrate on which a plurality of color filter substrates are arranged, and allowing the liquid crystals to be uniformly dispensed over the entire image display region by the pressure at which the first and second mother substrates are attached together, thereby forming the liquid crystal layer.

Therefore, in a case where the liquid crystal layer is formed in the liquid crystal panel using the dropping method, the seal pattern is necessarily formed as a closed pattern surrounding the outline of the pixel region so as to prevent the liquid crystals from being leaked to the outside of the image display region.

The dropping method can drop the liquid crystals for a shorter period of time than a vacuum injection method, and the liquid crystal layer can be very quickly formed even when area of the liquid crystal panel becomes large. Since a required quantity of liquid crystals are dropped on the substrate, the dropping method prevents an increase in cost of the liquid crystal panel due to the disuse of high-priced liquid crystals in the vacuum injection method, thereby improving the price competitiveness of products.

Subsequently, the first and second mother substrates are attached together by the sealant by applying pressure to the first and second mother substrates in the state in which the first and second mother substrates on which the liquid crystals are dropped and the sealant is coated as described above, and simultaneously, the liquid crystals dropped by the application of the pressure are uniformly dispensed over the entire liquid crystal panel (S108). A plurality of liquid crystal panels each having the liquid crystal layer formed therein are formed on the large-area first and second mother substrates through the process described above, and the large-area first and second mother substrates having the plurality of liquid crystal panels formed therein are separated from the subsidiary substrate. (S109) Then, the separated first and second mother substrates are divided into a plurality of liquid crystal panels through processing and cutting, and each liquid crystal panel is examined, thereby fabricating the LCD (S110).

In this case, the air blowing path is formed between the thin glass substrate and the subsidiary substrate using the edge cut formed in the glass substrate as described above, so that the subsidiary substrate can be easily separated from the liquid crystal panel in a cell state, which is attached by completing the processes.

Figure 5A:
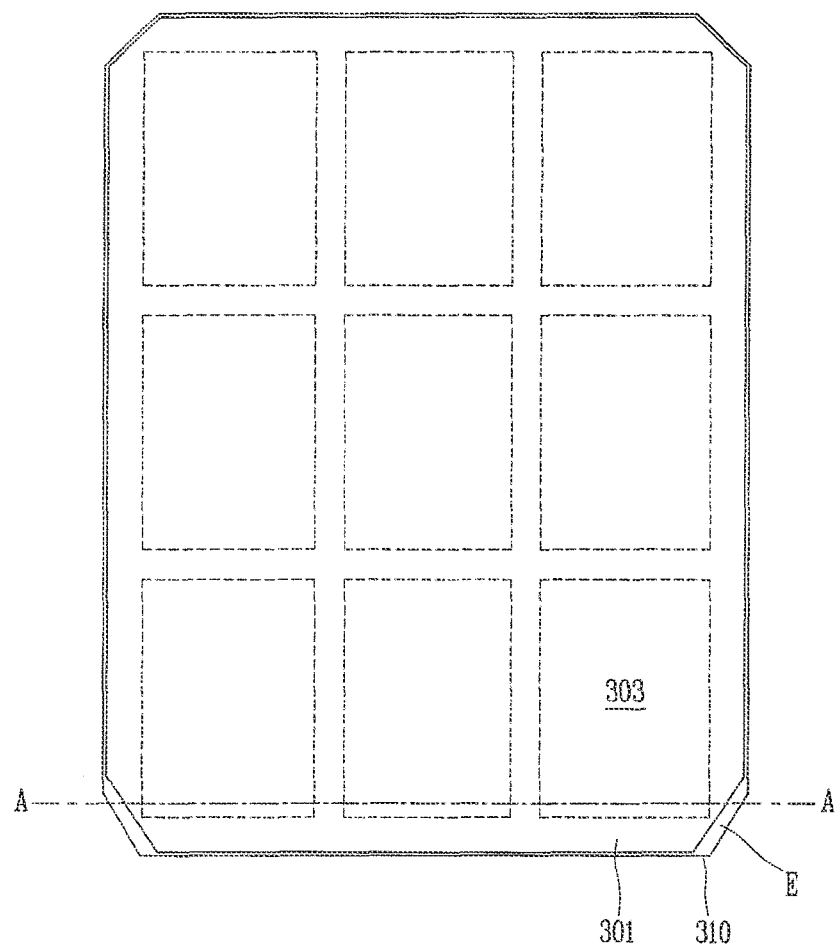
FIGS. 5A and 5B are respectively plan and sectional views schematically illustrating first and second mother substrates in an attached state, in which an edge cut is formed according to an exemplary embodiment of the present invention.
Figure 5B:
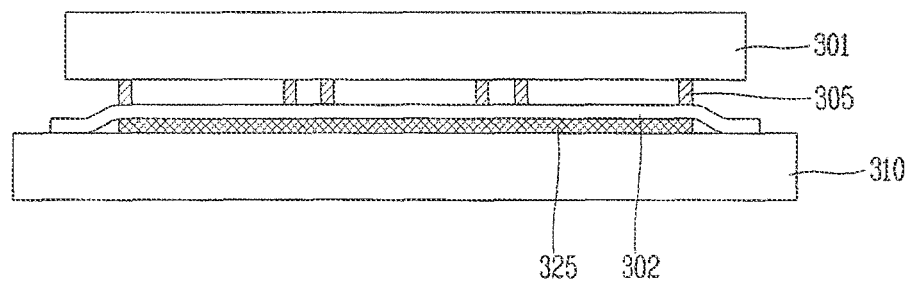

FIGS. 5A and 5B are respectively plan and sectional views schematically illustrating first and second mother substrates in an attached state, in which an edge cut is formed according to an exemplary embodiment of the present invention. FIG. 5B shows a section taken along line A-A of the first and second mother substrates in the attached state shown in FIG. 5A.

Referring to FIGS. 5A and 5B, edges of first and second mother substrates 301 and 302 and a subsidiary substrate 310 in an attached state, in which a plurality of liquid crystal panels 303 are formed, are cut to be inclined at a predetermined angle. Particularly, as the upper first mother substrate 301 is cut further inward than the lower subsidiary substrate 310, an edge portion E of the lower subsidiary substrate 310 is exposed. Here, the edge portion E is referred to as an edge cut.

In this case, the edge cut may be formed in the first and second mother substrates 301 and 302 and the subsidiary substrate 310 before an array process or a color filter process is performed.

For reference, the liquid crystal panel 303 includes a color filter substrate, an array substrate and a liquid crystal layer (not shown) formed between the color filter substrate and the array substrate. The attachment between the color filter substrate and the array substrate is performed by a seal pattern 305 formed at the outline of an image display region.

Hereinafter, the method of separating the subsidiary substrate from the liquid crystal panel in a cell state, which is attached using the edge cut, will be described in detail with reference to the following drawings.

For reference, in a case where the detachment of the subsidiary substrate from the liquid crystal panel is not performed using the edge cut but performed using a hand or film-shaped object, the thin glass substrate may be damaged in the detachment, or the subsidiary substrate may be again attached to the liquid crystal panel during the detachment. This is because it is not easy to form a space between the subsidiary substrate and the thin glass substrate and because the space is not formed with a certain pressure.

FIGS. 6A to 6E are sectional views sequentially illustrating separation processes of a subsidiary substrate in the method according to an exemplary embodiment of the present invention. FIG. 7 is an exemplary view schematically illustrating a process of forming an air blowing path between a thin glass substrate and a thin subsidiary substrate in the method according to an exemplary embodiment of the present invention.

Figure 6A:
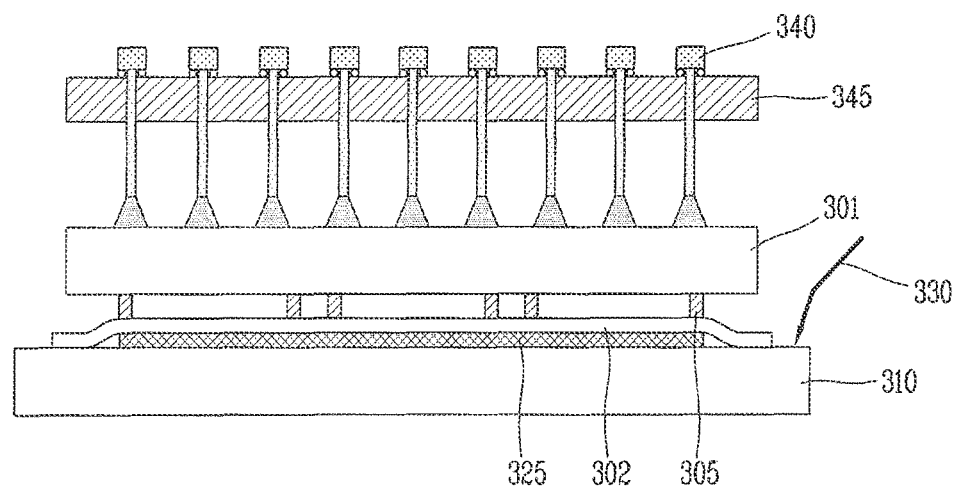
FIGS. 6A to 6E are sectional views sequentially illustrating separation processes of a subsidiary substrate in the method according to an exemplary embodiment of the present invention.
Figure 6B:
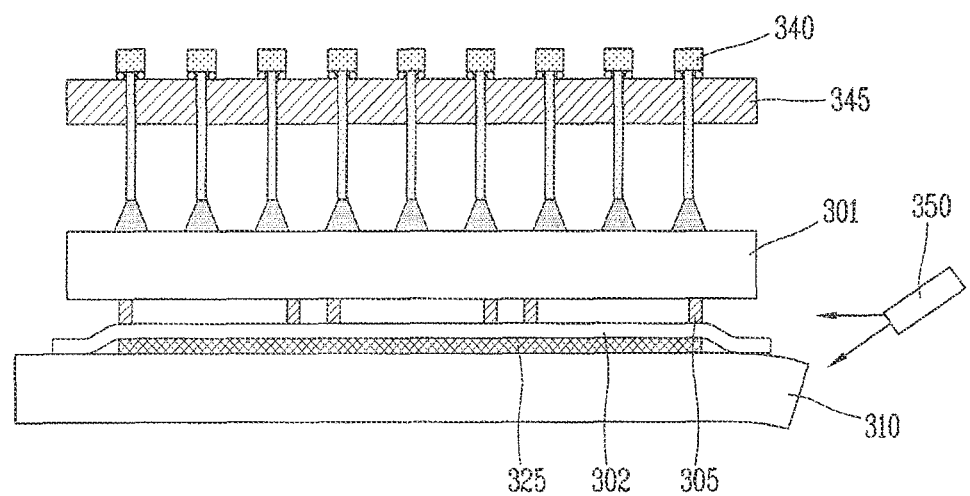
Figure 6C:
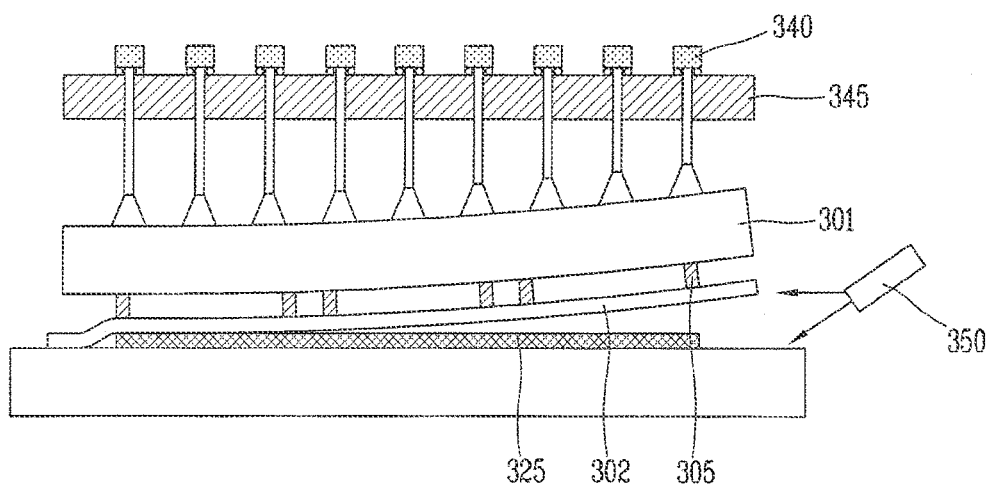
Figure 6D:
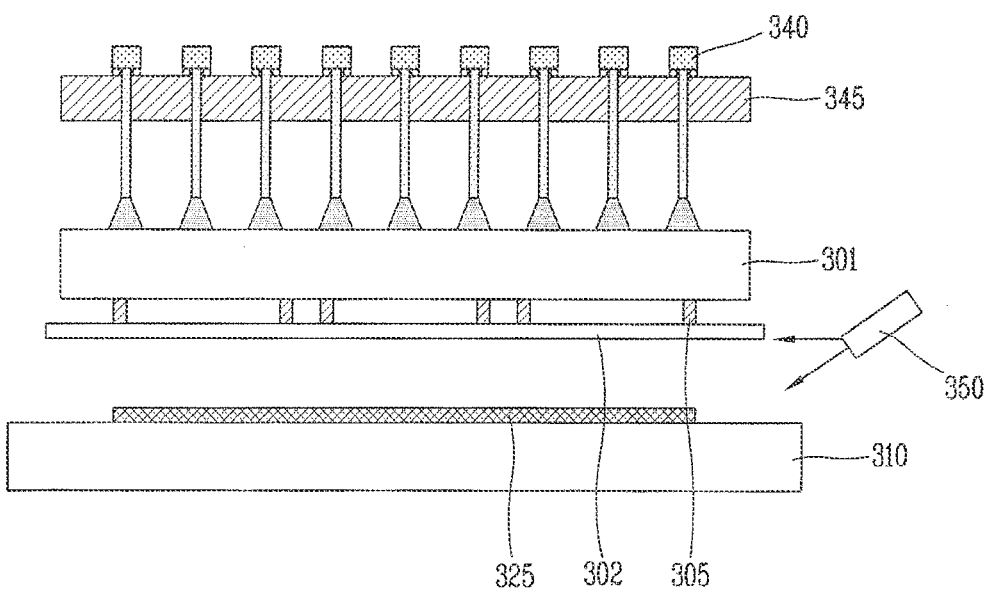
Figure 6E:
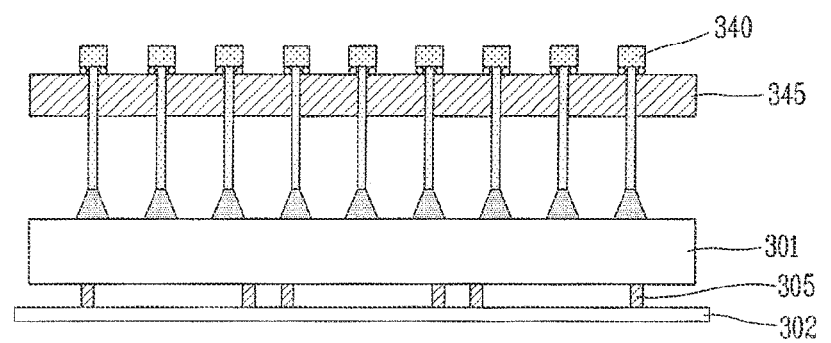
Figure 7:
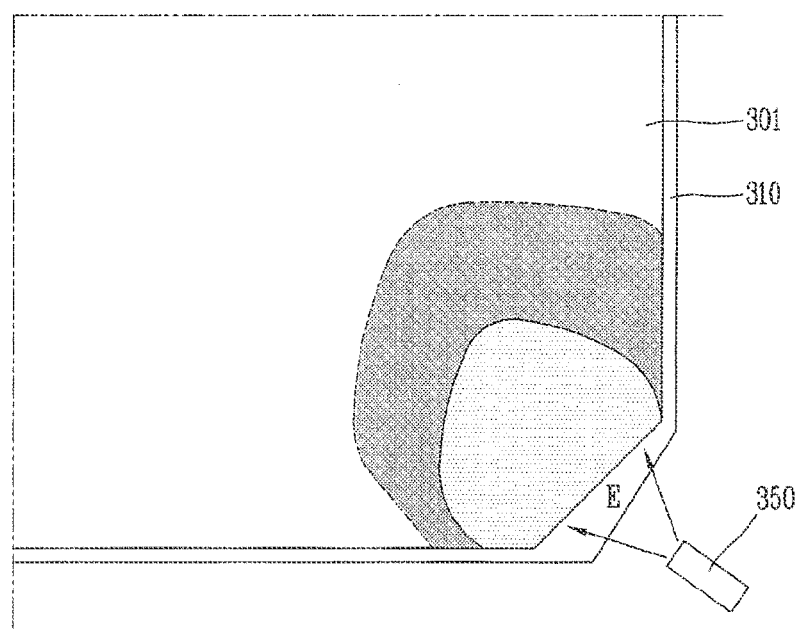
FIG. 7 is an exemplary view schematically illustrating a process of forming an air blowing path between a thin glass substrate and a thin subsidiary substrate in the method according to an exemplary embodiment of the present invention.

As shown in FIG. 6A, the subsidiary substrate 310 attached to the first and second mother substrates 301 and 302 attached by completing the processes is necessarily separated from the attached first and second mother substrates 301 and 302 so as to perform a subsequent process. To this end, the first mother substrate 301 is fixed by absorbing the top of the first mother substrate 301 using a plurality of vacuum pads 340. In other words, the vacuum pads 340 are attached to the top of the mother substrate 301. For reference, element 345 is a pad plate for fixing the plurality of vacuum pads 340.

In the state in which the first mother substrate 301 is fixed, a space is formed between the subsidiary substrate 310 and the thin glass substrate, i.e., the second mother substrate 302 by pressing the exposed edge portion E of the subsidiary substrate 310 in a lower direction with a predetermined pressure using a push-bar or pin-shaped tool 330.

Subsequently, as shown in FIGS. 6A to 6E and 7, the detachment is performed by spraying air into the space formed between the subsidiary substrate 310 and the second mother substrate 302 through a predetermined air spray apparatus 350. In this case, the detachment using a surfactant such as soapy water or an ionizer may be used as well as the air spray using the air spray apparatus 350.

In the state in which the air is sprayed into the space formed between the subsidiary substrate 310 and the second mother substrate 302 through the air spray apparatus 350, the attached first and second mother substrates 301 and 302 may be separated from the subsidiary substrate 310 by gradually lifting the vacuum pads 340. For example, the separation of the attached first and second mother substrates 301 and 302 from the subsidiary substrate 310 may be started from one side of the subsidiary substrate 310, at which the air spray apparatus 350 is positioned. In this case, the vacuum pads 340 are gradually lifted as close to the region in which the edge cut is formed, so that the attached first and second mother substrates 301 and 302 can be separated from the subsidiary substrate 310. However, the present invention is not limited thereto.

As described above, in the method of fabricating a lightweight and thin LCD according to the present invention, the air blowing path is formed between the thin glass substrate and the subsidiary substrate using the edge cut formed in the glass substrate, so that the subsidiary substrate can be easily separated from the liquid crystal panel in the cell state, which is attached by completing the processes. As a result, it is possible to obtain stabilization of processes, thereby improving the price competitiveness of products.

Meanwhile, although it has been described in the aforementioned embodiment that the subsidiary substrate is attached to only the second mother substrate using the thin glass substrate as the second mother substrate of the color filter substrate, and the general glass substrate having the thickness of 0.5 t to 0.7 t is used as the first mother substrate of the array substrate, the present invention is not limited thereto. As described above, the present invention may be applied to the case where the subsidiary substrates are attached to both the first and second mother substrates using the thin glass substrate, respectively. This will be described in detail with reference to the following drawings.

FIGS. 8A to 8I are sectional view sequentially illustrating separation processes of the subsidiary substrate in the method according to an exemplary embodiment of the present invention.

Figure 8A:
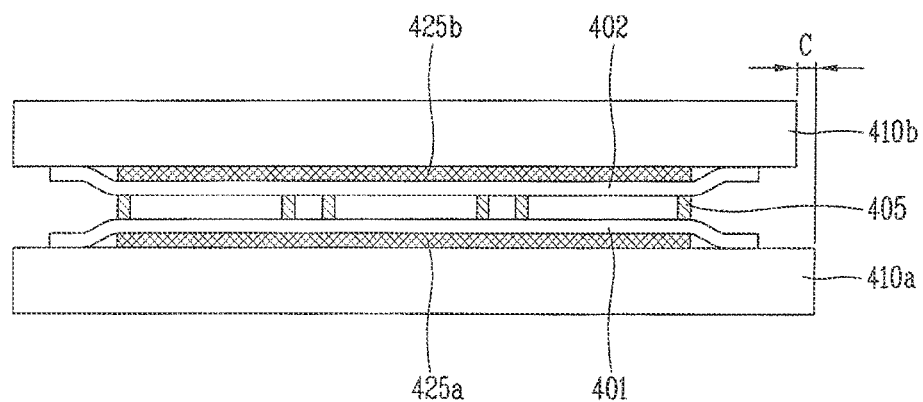
FIGS. 8A to 8I are sectional view sequentially illustrating separation processes of the subsidiary substrate in the method according to an exemplary embodiment of the present invention.
Figure 8B:
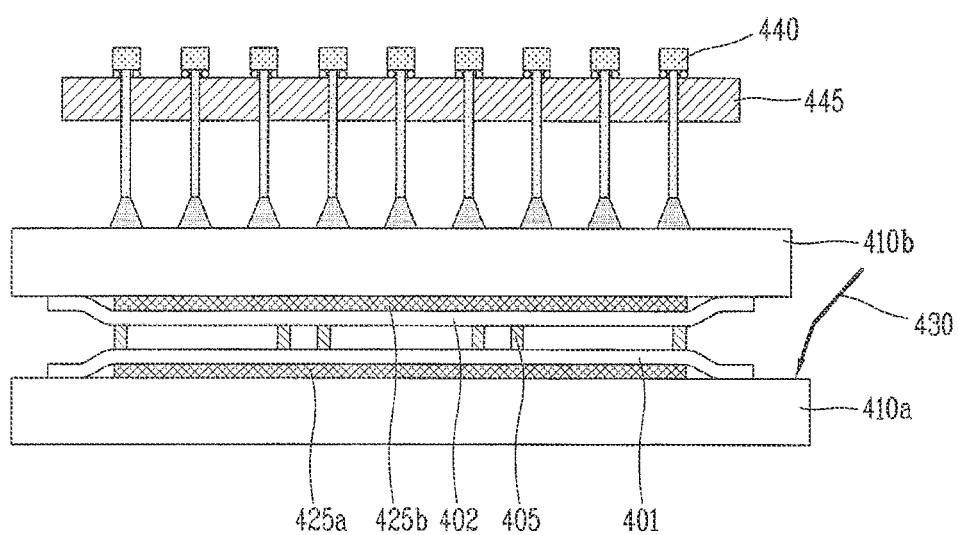

As shown in FIGS. 8A and 8B, first and second subsidiary substrates 410a and 410b attached to first and second mother substrates 401 and 402 attached by completing processes are necessarily separated from the respective first and second mother substrates 401 and 402 so as to perform a subsequent process. To this end, the second subsidiary substrate 410b is fixed by absorbing the top of the second subsidiary substrate 410b using a plurality of vacuum pads 440. For reference, element 445 is a pad plate for fixing the plurality of vacuum pads 440.

In this case, the attached first and second mother substrates 401 and 402 are in a state in which the second mother substrate 402 having color filter substrates formed thereon is stacked on the first mother substrate 401 having TFT array substrates formed thereon. However, the present invention is not limited thereto, and the attached first and second mother substrates 401 and 402 may be in a state in which the first mother substrate 401 having the TFT array substrates formed thereon is stacked on the second mother substrate having the color filter substrates formed thereon.

In this case, the first mother substrate 401 having the TFT array substrates formed thereon and the second mother substrate 402 having the color filter substrates formed thereon may be formed as thin glass substrates having a thickness of about 0.1 t to 0.5 t. To perform a subsequent process, the first and second subsidiary substrates 410a and 410b having a thickness of about 0.3 t to 0.7 t, on which predetermined plasma treatments or prominent patterns are formed, may be attached to the thin glass substrates, i.e., the first and second mother substrates 401 and 402, respectively. However, the present invention is not limited to the thicknesses of the thin first and second mother substrates 401 and 402 and the first and second subsidiary substrates 410a and 410b.

The attachment between the first mother substrate 401 and the first subsidiary substrate 410a may be performed by contacting the two substrates 401 and 410a with each other in the vacuum state, and the attachment between the second mother substrate 402 and the second subsidiary substrate 410b may be performed by contacting the two substrates 402 and 410b with each other in the vacuum state. In this case, the attachment force between the two substrates may be presumed as an electrostatic force, vacuum force, surface tension, etc.

Edges of the first and second mother substrates 401 and 402 and the first and second subsidiary substrates 410a and 410b, in an attached state, in which a plurality of liquid crystal panels are formed, are cut to be inclined at a predetermined angle. Particularly, as the upper second subsidiary substrate 410b is cut further inward than the lower first subsidiary substrate 410a, an edge portion of the lower first subsidiary substrate 410a is exposed. Here, the edge portion is referred to as an edge cut C.

The edge cut C may be formed in the first and second mother substrates 401 and 402 and the first and second subsidiary substrates 410a and 410b before the array process or the color filter process is performed.

Although not shown in these figures, the liquid crystal panel includes a color filter substrate, an array substrate and a liquid crystal layer (not shown) formed between the color filter substrate and the array substrate. The attachment between the color filter substrate and the array substrate is performed by a seal pattern 405 formed at the outline of an image display region.

For reference, although it has been illustrated in these figures that predetermined prominent patterns 425a and 425b are formed on surfaces of the first and second subsidiary substrates 410a and 410b, respectively, the present invention is not limited thereto. In the present invention, a plasma treatment may be performed on the surfaces of the first and second subsidiary substrates 410a and 410b, and the first and second mother substrates 401 and 402 may be attached together without perform any treatment.

In the fixed state described above, a space is formed between the first subsidiary substrate 410a and the thin glass substrate, i.e., the first mother substrate 401 by pressing the exposed edge portion of the first subsidiary substrate 410a in a lower direction with a predetermined pressure using a push-bar or pin-shaped tool 430.

Figure 8C:
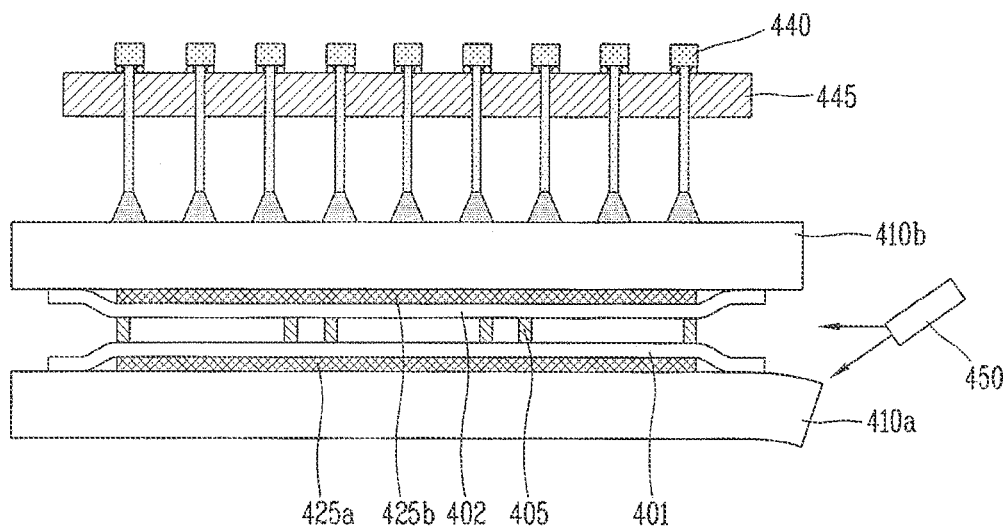
Figure 8D:
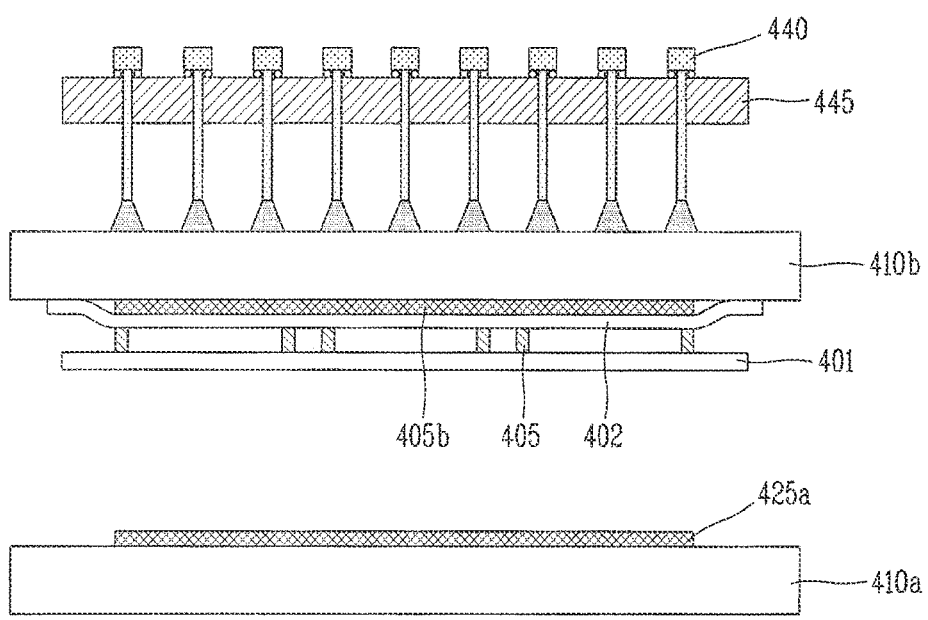

Subsequently, as shown in FIGS. 8C and 8D, the detachment is performed by spraying air into the space formed between the first subsidiary substrate 410a and the first mother substrate 401 through a predetermined air spray apparatus 450. In this case, the detachment using a surfactant such as soapy water or an ionizer may be used as well as the air spray using the air spray apparatus 450.

In the state in which the air is sprayed into the space formed between the first subsidiary substrate 410a and the first mother substrate 401 through the air spray apparatus 450, the attached first and second mother substrates 401 and 402 may be separated from the first subsidiary substrate 410a by gradually lifting the vacuum pads 440. For example, the separation of the attached first and second mother substrates 401 and 402 from the first subsidiary substrate 410a may be started from one side of the first subsidiary substrate 410a, at which the air spray apparatus 450 is positioned. In this case, the vacuum pads 440 are gradually lifted as close to the region in which the edge cut is formed, so that the attached first and second mother substrates 401 and 402 can be separated from the first subsidiary substrate 410a. However, the present invention is not limited thereto.

Figure 8E:
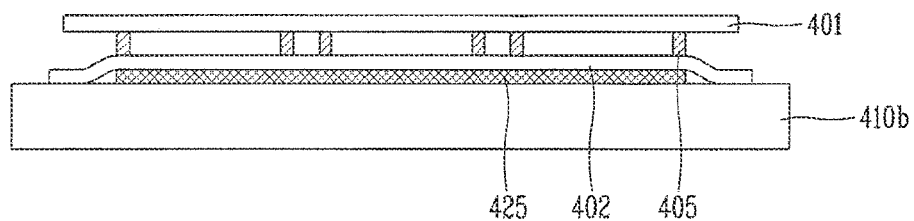

Subsequently, as shown in FIG. 8E, the first and second mother substrates 401 and 402 are vertically reversed in the state in which the first subsidiary substrate 410a is separated from the first and second mother substrates 401 and 402. That is, in a case where the second mother substrate 402 is stacked on the first mother substrate 401 as described above, the attached first and second mother substrates 401 and 402 are vertically reversed so that the first mother substrate 401 is stacked on the second mother substrate 402.

Subsequently, as shown in FIGS. 8F to 8I, the second subsidiary substrate 410b is separated from the attached first and second substrates 401 and 402 through the substantially same process as the aforementioned separation process of the subsidiary substrate.

Figure 8F:
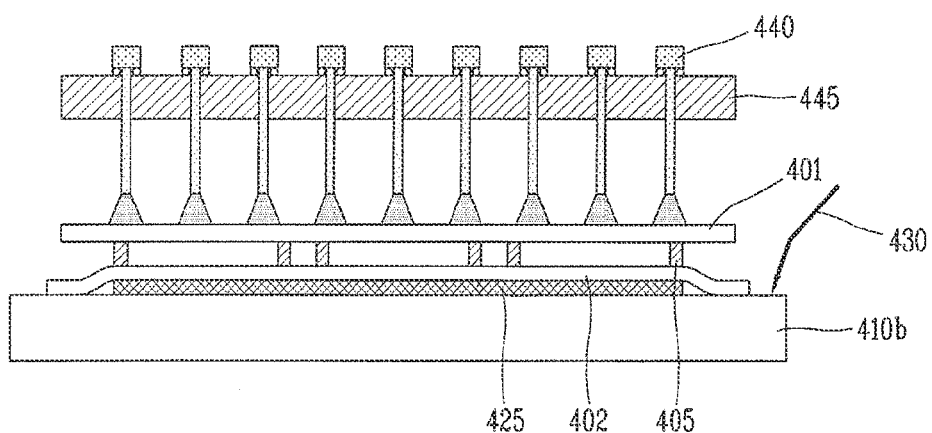

That is, as shown in FIG. 8F, the first mother substrate 401 is first fixed by absorbing the top of the first mother substrate 401 using the plurality of vacuum pads 440.

In this case, as the lower second subsidiary substrate 410b is further protruded than the upper first and second mother substrates 401 and 402, the edge portion of the second subsidiary substrate 410b is exposed. Here, the exposed edge portion may be used as the edge cut described above.

In the fixed state described above, a space is formed between the second subsidiary substrate 410b and the thin glass substrate, i.e., the second mother substrate 402 by pressing the exposed edge portion of the second subsidiary substrate 410b in a lower direction with a predetermined pressure using the push-bar or pin-shaped tool 430.

Figure 8G:
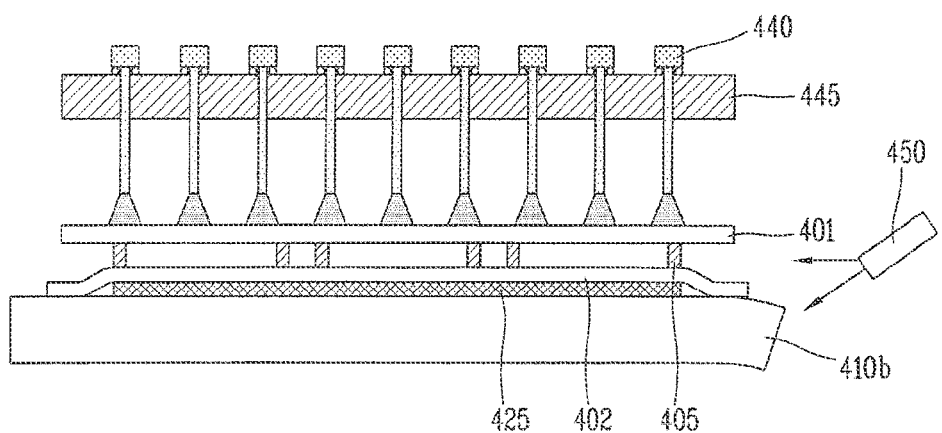
Figure 8H:
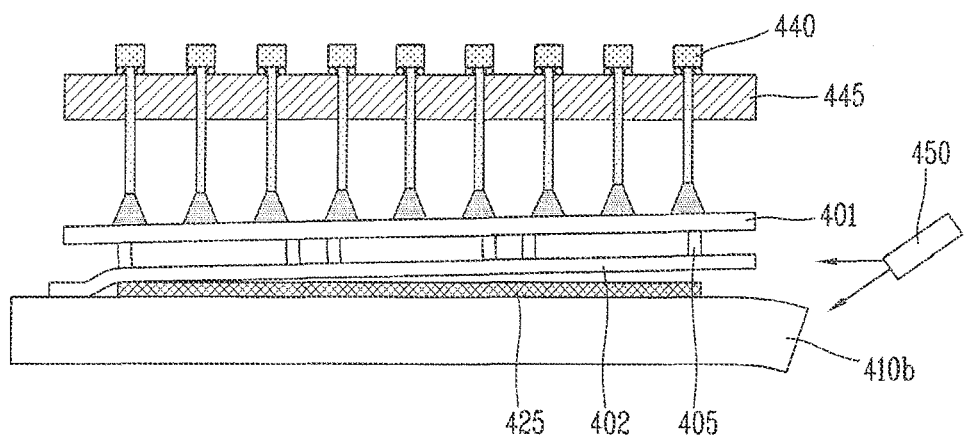
Figure 8I:
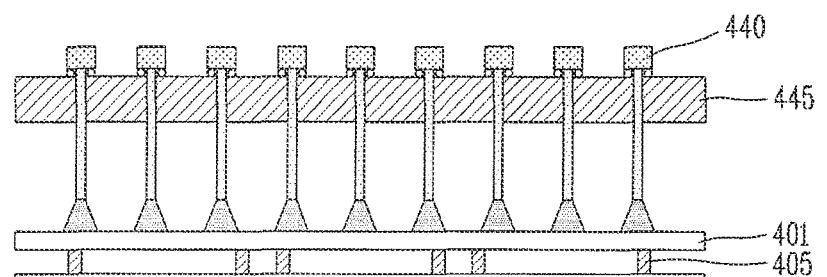
Figure 8I:
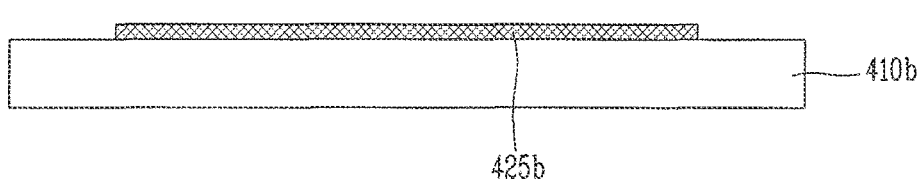

Subsequently, as shown in FIGS. 8G to 8I, the detachment is performed by spraying air into the space formed between the second subsidiary substrate 410b and the second mother substrate 402 through the predetermined air spray apparatus 450. In this case, the detachment using a surfactant such as soapy water or an ionizer may be used as well as the air spray using the air spray apparatus 450.

In the state in which the air is sprayed into the space formed between the second subsidiary substrate 410b and the second mother substrate 402 through the air spray apparatus 450, the attached first and second mother substrates 401 and 402 may be separated from the second subsidiary substrate 410b by gradually lifting the vacuum pads 440. For example, the separation of the attached first and second mother substrates 401 and 402 from the second subsidiary substrate 410b may be started from one side of the second subsidiary substrate 410b, at which the air spray apparatus 450 is positioned. In this case, the vacuum pads 440 are gradually lifted as close to the region in which the edge cut is formed, so that the attached first and second mother substrates 401 and 402 can be separated from the second subsidiary substrate 410b. However, the present invention is not limited thereto.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of fabricating a lightweight and thin liquid crystal display (LCD), the method comprising:
   providing a first mother substrate, a subsidiary substrate and a thin second mother substrate;
   forming an edge cut by cutting edges of the first and second mother substrates and the subsidiary substrate to be inclined at a predetermined angle;
   performing an array process on the first mother substrate;
   attaching the subsidiary substrate to the second mother substrate;

performing a color filter process on the second mother substrate having the subsidiary substrate attached thereto;

attaching together the first and second mother substrates; and separating the subsidiary substrate from the first and second mother substrates by spraying air between the second mother substrate and the subsidiary substrate, in which the edge cut is formed.

2. The method of claim 1, wherein the first mother substrate is cut further inward than the subsidiary substrate so that an edge portion of the subsidiary substrate is exposed.

3. The method of claim 2, further comprising fixing the first mother substrate by absorbing a top of the first mother substrate using a plurality of vacuum pads, after the first and second mother substrates are attached together.

4. The method of claim 3, further comprising forming a space between the subsidiary substrate and the second mother substrate by pressing the exposed edge portion of the subsidiary substrate in a lower direction with a predetermined pressure using a push-bar or pin-shaped tool in the state in which the first mother substrate is fixed by absorbing the top of the first mother substrate using the plurality of vacuum pads.

5. The method of claim 4, wherein the subsidiary substrate is separated from the first and second mother substrates by spraying air into the space formed between the subsidiary substrate and the second mother substrate through an air spray apparatus or by using a surfactant.

6. The method of claim 5, wherein the first and second mother substrates are separated from the subsidiary substrate by gradually lifting the vacuum pads in the state in which the subsidiary substrate is separated from the first and second mother substrates by spraying air into the space formed between the subsidiary substrate and the second mother substrate through the air spray apparatus or by using the surfactant.

7. The method of claim 6, wherein the first and second mother substrates are separated from the subsidiary substrate by gradually lifting the vacuum pads as close to an edge portion of the first mother substrate, in which the edge cut is formed.

8. The method of claim 1, wherein the attaching of the subsidiary substrate to the second mother substrate comprises:

performing a chemical treatment including at least one of a plasma treatment or forming prominent patterns on a surface of the subsidiary substrate; and attaching, to the second mother substrate, the subsidiary substrate on which the chemical treatment is performed or the patterns are formed.

9. The method of claim 1, wherein the second mother substrate has a thickness of about 0.1 mm to 0.5 mm.

10. The method of claim 1, wherein the subsidiary substrate has a thickness of about 0.3 mm to 0.7 mm.

11. A method of fabricating a lightweight and thin LCD, the method comprising:

providing first and second subsidiary substrates and thin first and second mother substrates;

forming an edge cut by cutting edges of the first and second subsidiary substrates to be inclined at a predetermined angle;

respectively attaching the first and second subsidiary substrates to the first and second mother substrates;

performing an array process on the first mother substrate having the first subsidiary substrate attached thereto;

performing a color filter process on the second mother substrate having the second subsidiary substrate attached thereto;

attaching together the first and second mother substrates;

separating the first subsidiary substrate from the first and second mother substrates by spraying air between the first mother substrate and the first subsidiary substrate, in which the edge cut is formed; and separating the second subsidiary substrate from the first and second mother substrates by spraying air between the second mother substrate and the second subsidiary substrate, in which the edge cut is formed.

12. The method of claim 11, wherein the second subsidiary substrate is cut further inward than the first subsidiary substrate so that an edge portion of the first subsidiary substrate is exposed.

13. The method of claim 12, further comprising fixing the second subsidiary substrate by absorbing a top of the second subsidiary substrate using a plurality of vacuum pads, after the first and second mother substrates are attached together.

14. The method of claim 13, further comprising forming a space between the first subsidiary substrate and the first mother substrate by pressing the exposed edge portion of the first subsidiary substrate in a lower direction with a predetermined pressure using a push-bar or pin-shaped tool in the state in which the second subsidiary substrate is fixed by absorbing the top of the second subsidiary substrate using the plurality of vacuum pads.

15. The method of claim 14, wherein the first subsidiary substrate is separated from the first and second mother substrates by spraying air into the space formed between the first subsidiary substrate and the first mother substrate through an air spray apparatus or by using a surfactant.

16. The method of claim 15, wherein the first and second mother substrates are separated from the first subsidiary substrate by gradually lifting the vacuum pads in the state in which the first subsidiary substrate is separated from the first and second mother substrates by spraying air into the space formed between the first subsidiary substrate and the first mother substrate through the air spray apparatus or by using the surfactant.

17. The method of claim 16, wherein the first and second mother substrates are separated from the first subsidiary substrate by gradually lifting the vacuum pads as close to the edge portion of the first subsidiary substrate, in which the edge cut is formed.

18. The method of claim 17, further comprising vertically reversing the first and second mother substrates in the state in which the first subsidiary substrate is separated from the first and second mother substrates.

19. The method of claim 18, wherein the second subsidiary substrate is separated from the attached first and second mother substrates.

20. The method of claim 11, wherein the attaching of the first and second subsidiary substrates to the respective first and second mother substrates comprises:

performing a chemical treatment including at least one of a plasma treatment or forming prominent patterns on surfaces of the first and second subsidiary substrates; and respectively attaching, to the first and second mother substrates, the first and second subsidiary substrates on which the chemical treatment is performed or the patterns are formed.

21. The method of claim 11, wherein the first and second mother substrates have a thickness of about 0.1 mm to 0.5 mm.

22. The method of claim 11, wherein the first and second subsidiary substrates have a thickness of about 0.3 mm to 0.7 mm.

* * * * *